United States Patent [19]

Frangioso et al.

[11] Patent Number: 5,396,111
[45] Date of Patent: Mar. 7, 1995

[54] CLOCKING UNIT FOR DIGITAL DATA PROCESSING

[75] Inventors: Ralph C. Frangioso, Franklin; Paul Rebello, Northboro; Joseph M. Dunbar, Brookfield, all of Mass.

[73] Assignee: Data General Corporation, Westboro, Mass.

[21] Appl. No.: 29,457

[22] Filed: Mar. 11, 1993

[51] Int. Cl.$^6$ .............................................. H03K 5/13
[52] U.S. Cl. .................................. 327/144; 327/141; 327/161; 327/295
[58] Field of Search ................... 307/269, 271; 328/62, 328/72, 55, 63

[56] References Cited

U.S. PATENT DOCUMENTS

| | | | |
|---|---|---|---|
| 4,191,998 | 3/1980 | Carmody | 307/269 |
| 4,399,410 | 8/1983 | Siegmund et al. | 328/55 |
| 4,700,350 | 10/1987 | Douglas et al. | 307/269 |
| 4,800,558 | 1/1989 | Nichols | 328/62 |
| 4,847,516 | 7/1989 | Fujita et al. | 328/62 |
| 4,862,096 | 8/1989 | Spence | 328/55 |
| 4,870,665 | 9/1989 | Vaughn | 307/271 |
| 5,057,784 | 10/1991 | Park | 328/271 |
| 5,086,387 | 2/1992 | Arroyo et al. | 307/269 |
| 5,087,829 | 2/1992 | Ishibashi et al. | 307/269 |
| 5,122,679 | 6/1992 | Ishii et al. | 328/63 |

FOREIGN PATENT DOCUMENTS

WO 91/10951 7/1991 WIPO .

OTHER PUBLICATIONS

IBM Technical Bulletin, vol. 33 No. 1A, Jun. 1990.
IBM Technical Disclosure Bulletin, vol. 20 No. 11A Apr. 1978.
Meyer, Jeff, "Low Skew CMOS PLL Clock Driver", *Motorola Semiconductor Technical Data*, pp. 56–77.

Primary Examiner—John S. Heyman
Assistant Examiner—T. T. Lam
Attorney, Agent, or Firm—Robert F. O'Connell

[57] ABSTRACT

A technique for generating gated clock signals for use in enabling various operating gating units in a data processing system in which an internal reference clock signal is used to generate both processor clock signals and the gated clock signals such that the latter signals are substantially synchronous with the processor clock signals. D-flip-flop circuitry together with a delay unit having an adjustable time delay are used to generate a gated clock signal. The overall time delay, from the time of which the circuitry is enabled until the gated clock signal is produced, is appropriately set by selecting the required time delay so that the overall time delay is essentially the same as the time delay required to generate the processor clock signals. Accordingly, the edges of the gated clock signals can be made to coincide with the edges of the processor clock signals. The use of such gated clock signal generation circuitry can reduce the time needed to generate the gated clock signals from that required by previously used register PAL circuitry to improve performance of the processing system.

9 Claims, 6 Drawing Sheets

CLOCKING UNIT FOR DIGITAL DATA PROCESSING

INTRODUCTION

This invention relates generally to clocking units for providing clock signals for use in digital data processing systems and, more particularly, to an improved clocking unit for providing processor clock signals having fixed periods for clocking the operations of various components of the processing system and for further providing controllable gated clock signals having controllable edges that are substantially synchronous with edges of the processor clock signals for enabling the operation of various gating components of the system.

BACKGROUND OF THE INVENTION

Data processing systems normally require a plurality of internally generated processor clock signals derived from a reference clock signal, which processor clock signals have the same fixed periods and are available for clocking the operations of various components throughout the system. In a particular embodiment, for example, a first group of such internal processor clock signals are in phase with each other, while one or more other internal processor clock signals are either 90° or 180° out of phase with the first group.

In addition, many operating components in the system must be supplied with controllable gated clocked signals in order to be operable at the proper times, e.g., gated "select" signals for operating multiplexor units, gated "enabling" signals for operating latch units, and the like. Such latter units normally require the generation of gated signals as obtained from appropriate logic components, such as register programmed array logic (PAL) units. The operation of such PAL units inserts a time delay in the generation and supplying of the gated clock signals, which time delay, combined with other time delays inherent in the operation of the unit to which a gated signal is supplied, require a particular number of operating time cycles for the overall operation of generating and supplying such gated clock signals. If the time delays which arise in the generation and supplying of the gated signal can be reduced, in many cases the number of operating time cycles required for the overall operation of the gated unit can be reduced so as to improve the speed of operation of the processing system as a whole.

BRIEF SUMMARY OF THE INVENTION

In accordance with the invention, gated clock signals used for gating the operations of certain components of the system are generated by a specially designed gated clock generation unit rather than by using conventional register PAL units as are normally used for such purpose. Such gated clock signals, as generated by the clocking unit, are arranged so that the edge of a gated clock signal has a zero time delay relative to the edges of the internally generated processor clock signals so that the time delay normally imposed when using conventional gate signal register PAL logic units is reduced. More specifically, the gated clock generation unit includes means which can control the edges of the gated clock signals so that they are substantially synchronous with the edges of the processor clock signals and, accordingly, an edge of a gated clock signal has a zero time delay relative to an edge of the processor clock signals. Accordingly, the overall operation of a gated component can often save one or more of the usual number of operating time cycles normally required for the gating operation.

DESCRIPTION OF THE INVENTION

The invention can be described in more detail with the help of the accompanying drawings wherein.

Figure 1:
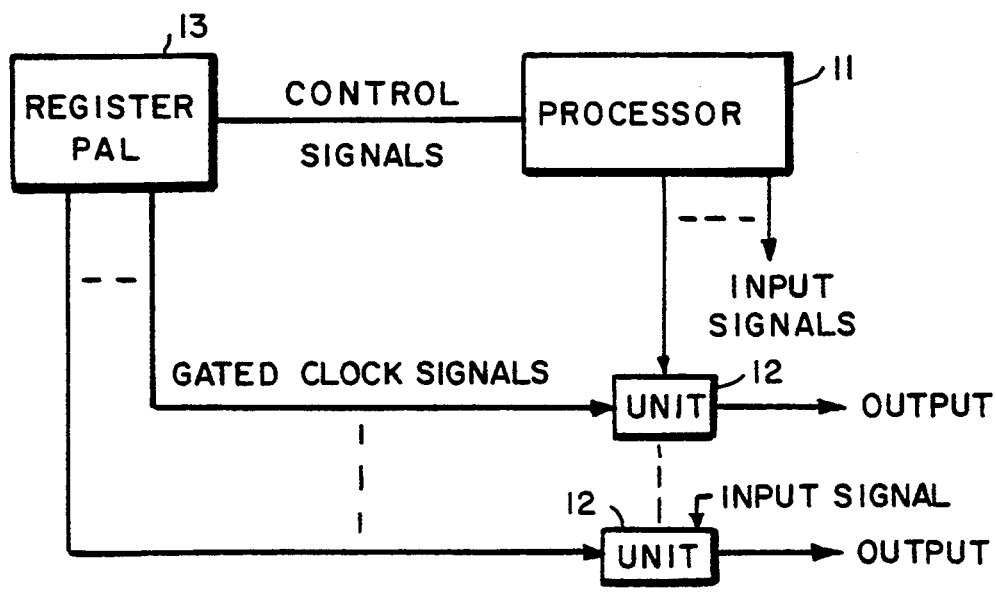
FIG. 1 shows a general block diagram of a data processing system of the prior art which uses a register PAL for generating gated clock signals.

In conventional data processing systems, as shown in FIG. 1, a processor 11 provides suitable gated clock signals from a register program-array-logic (PAL) unit 13 which, when controllably initiated by the control signals from the processor, produces desired gated clock signals for supplying to a plurality of operating units 12 of the system which are to be gated. Units 12, when gated, supply an output signal in response to an input signal supplied thereto by the processor. As mentioned above, the operation of register PAL unit 13 inserts a time delay into the gated signal generation operation which requires the overall gating operation to use a particular number of processor operating time cycles to complete. It is desired to reduce the number of such operating time cycles, if possible, when supplying gating signals to units 12 of the system, so as to provide improved performance of the processing system.

Figure 2:
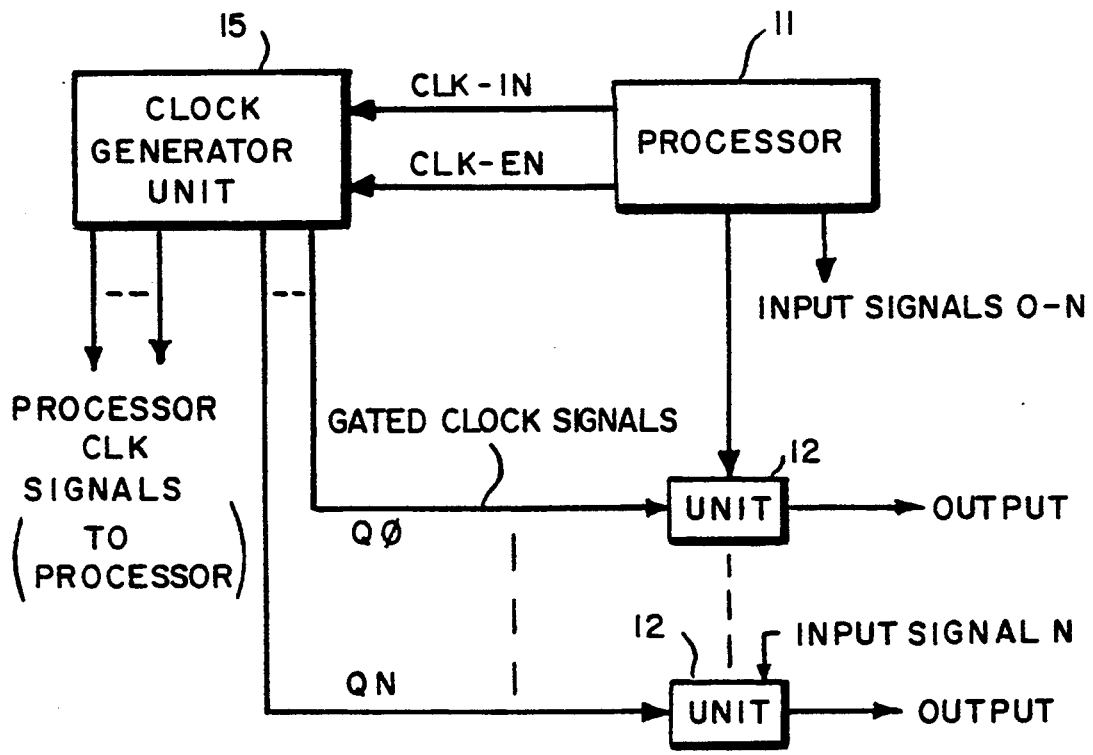
FIG. 2 shows a general block diagram of a system of the invention using a specially designed clock generation unit for generating gated clock signals.

FIG. 2 depicts a block diagram showing a clock generation unit 15 in accordance with the invention which can be used in the context of a typical digital data processing system. As seen therein, in the operation of a processor 11, it is desirable to provide the normal processor clock signals as well as to provide specified gated clock signals to gate the operation of units 12, to which gated clock signals $Q\phi$-QN are supplied. Units 12 may include various gated logic units, such as multiplexor units, latch units, and the like, the operation of which must be enabled by suitable gating clock signals so as to respond to input signals supplied thereto to produce output signals therefrom.

Figure 3:
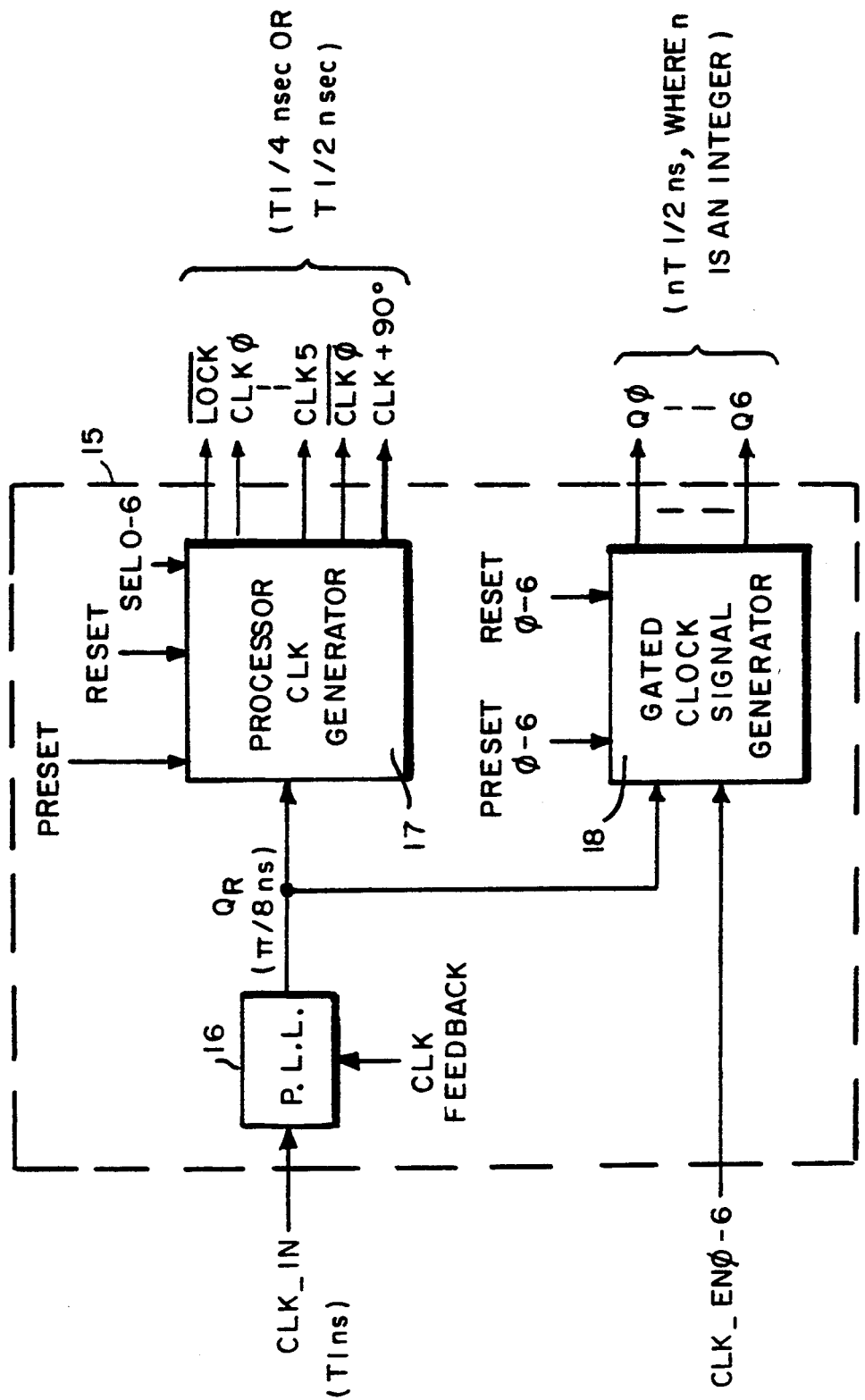
FIG. 3 shows a more specific block diagram of the clock generation unit of FIG. 2.

FIG. 3 depicts more specifically, a clock generation unit 15 of FIG. 2, in accordance with the invention. As seen therein, a free-running input clock signal (CLK_IN), e.g., having a period of T1 nanoseconds (nsec), is supplied to suitable circuitry 16 for providing an internally generated reference clock signal $Q_R$ having a period which is a sub-multiple of the period of the input clock signal, e.g., $T\frac{1}{8}$ nsec. Circuitry 16 may be in the form of a phase locked loop (PLL) circuit of a well known type, such as disclosed in (Reference), for example.

Processor clock generator circuitry 17 in the particular embodiment shown, responds to the reference clock signal $Q_R$ to produce, in a typical embodiment, for example, a plurality of processor clock signals, CLK$\phi$-CLK5, each of which signals is in phase with internal reference clock signal $Q_R$, a pair of processor clock signals $\overline{\text{CLK}\phi}$ and $\overline{\text{CLK1}}$ each of which is 180° out of phase with reference clock signal $Q_R$, and a processor clock signal CLK+90° which is 90° out of phase with reference clock signal $Q_R$. The periods of all of such clock signals are a multiple of that of the internal reference clock $Q_R$, such period being selectable in a particular embodiment, for example, to be either T$\frac{1}{4}$ nsec or T$\frac{1}{2}$ nsec.

In further accordance with the invention, unique gated clock signal generator circuitry 18 responds to the internal reference clock signal $Q_R$ to provide a plurality of gated clock signals Q$\phi$-Q6, the periods of which are controlled to be integral multiples of the period of the internal reference clock signal, e.g., nT$\frac{1}{2}$ where n is an integer and is controllably varied to be equal to or greater than 1.

In a particular embodiment, for example, where CLK_IN has a period T1=80 nsec, the period of $Q_R$ is 10 nsec, the period of each of clock signals CLK0-CLK5, CLK0 and CLK1, and CLK+90° can be selected to be either 20 nsec or 40 nsec, while the periods of Q$\phi$-Q6 are controllably varied to be 40 nsec, 80 nsec, 120 nsec, etc. Alternatively, the comparable periods, where T1=100 nsec, are 12.5 nsec (for $Q_R$), 25 nsec or 50 nsec (for the CLK signals) and 50 nsec, 100 nSEC, 150 nSEC, etc. (for the Q signals).

Figure 4:
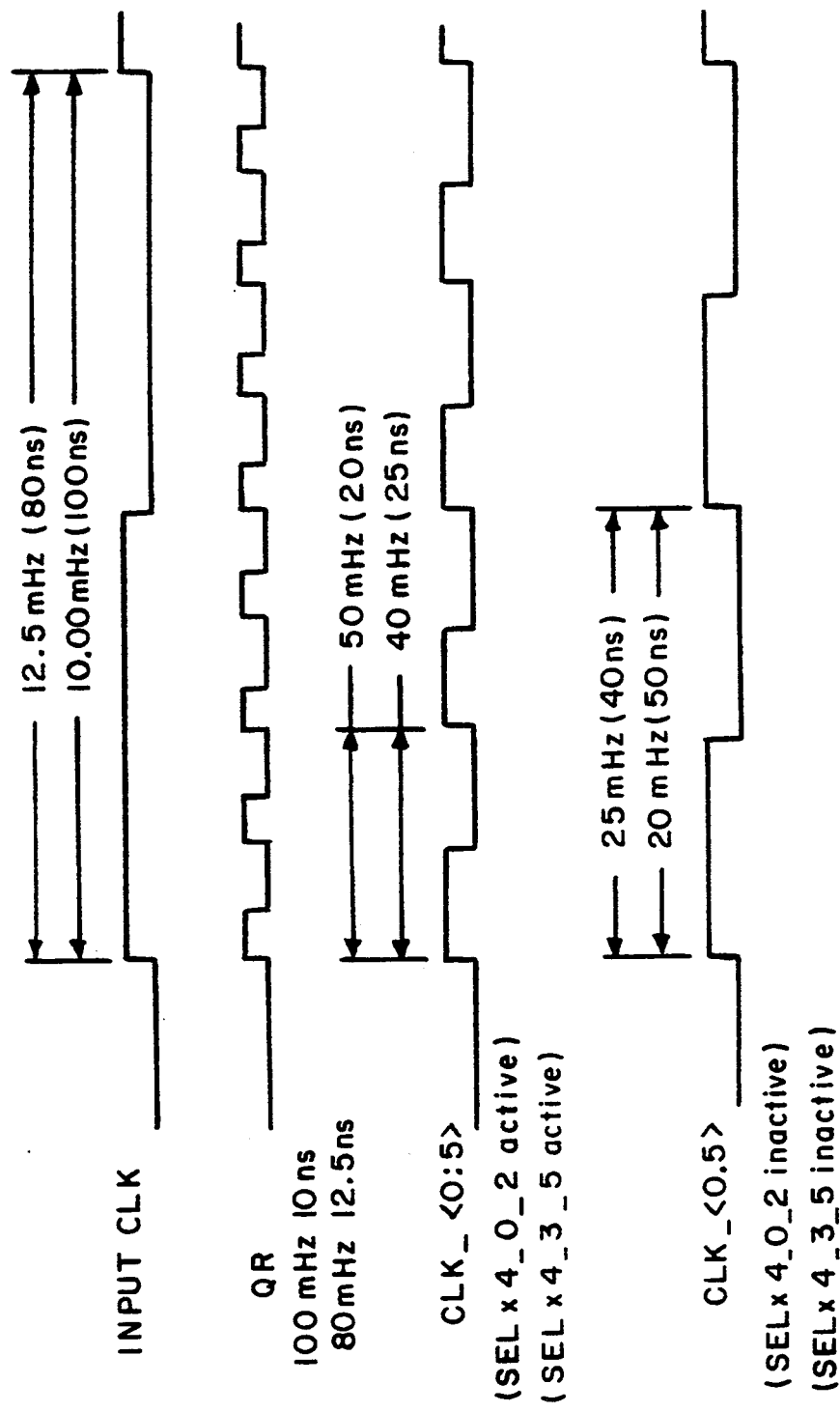
FIG. 4 shows timing diagrams of various timing signals of the clock generation unit of FIG. 2.
Figure 5:
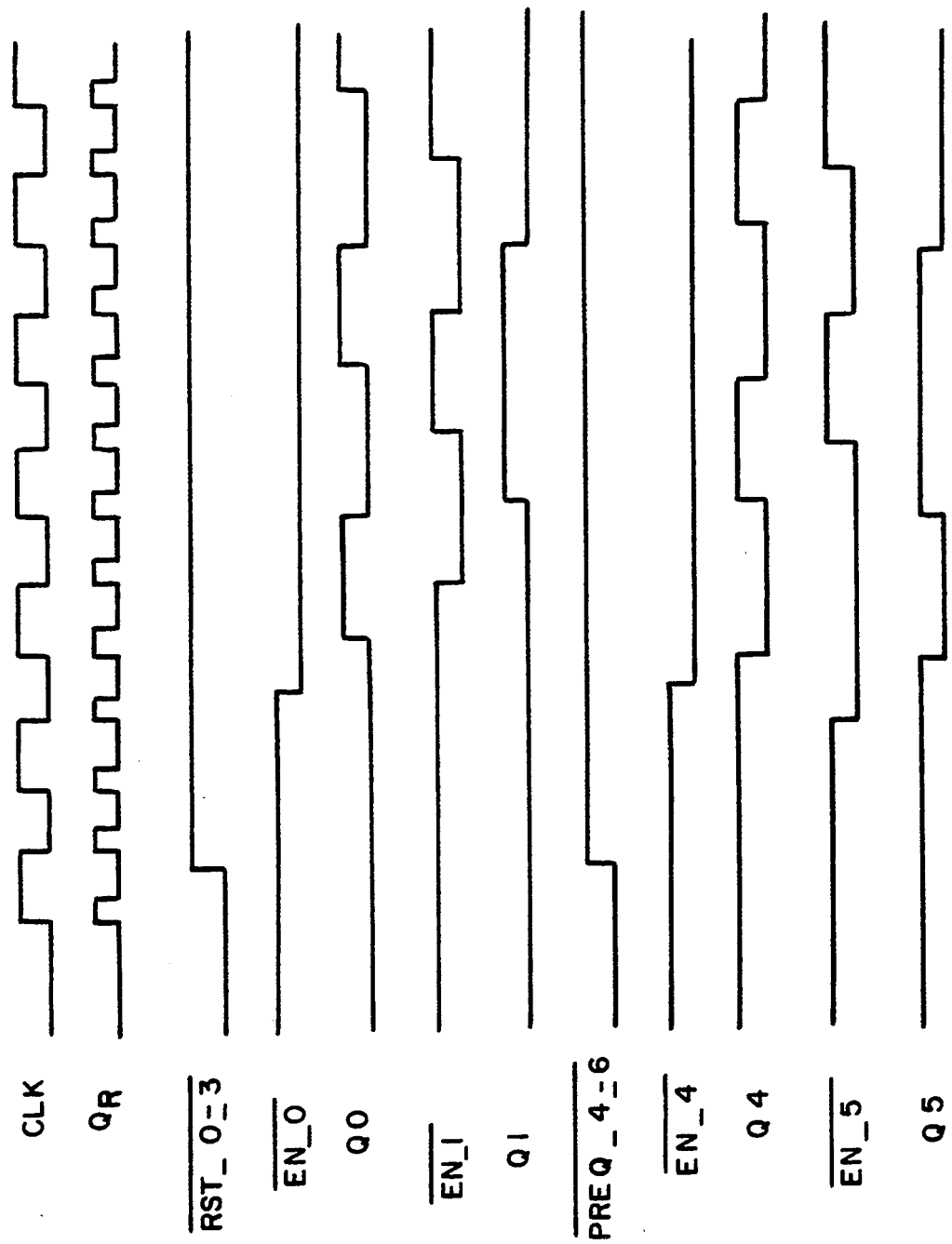
FIG. 5 shows further timing diagrams of various timing signals of the clock generation unit of FIG. 2.

FIGS. 4 and 5 show relationships among the various clock signals. FIG. 4, for example, shows a free-running input clock signal (CLK-IN) and the relation thereof to the internally generated reference clock ($Q_R$) having two alternative frequencies as well as the processor CLK signals CLK $\phi$-5 which are shown as having two alternative frequencies depending on which alternative frequency is selected for $Q_R$. For example, if the input clock has a frequency of 12.5 MegaHertz (MHz) the internal reference clock $Q_R$ in a particular embodiment can have a frequency of 100 MHz and the CLK $\phi$-5 signals can have frequencies of either 50 MHz or 25 MHz.

FIG. 5 shows relationships among the internal reference clock ($Q_R$) and controllable gated clock signals Q$\phi$-Q5 as well as other signals which are utilized in the generation thereof, as discussed with more detail with reference to the more specific circuitry of the clocking unit described below.

Figure 6:
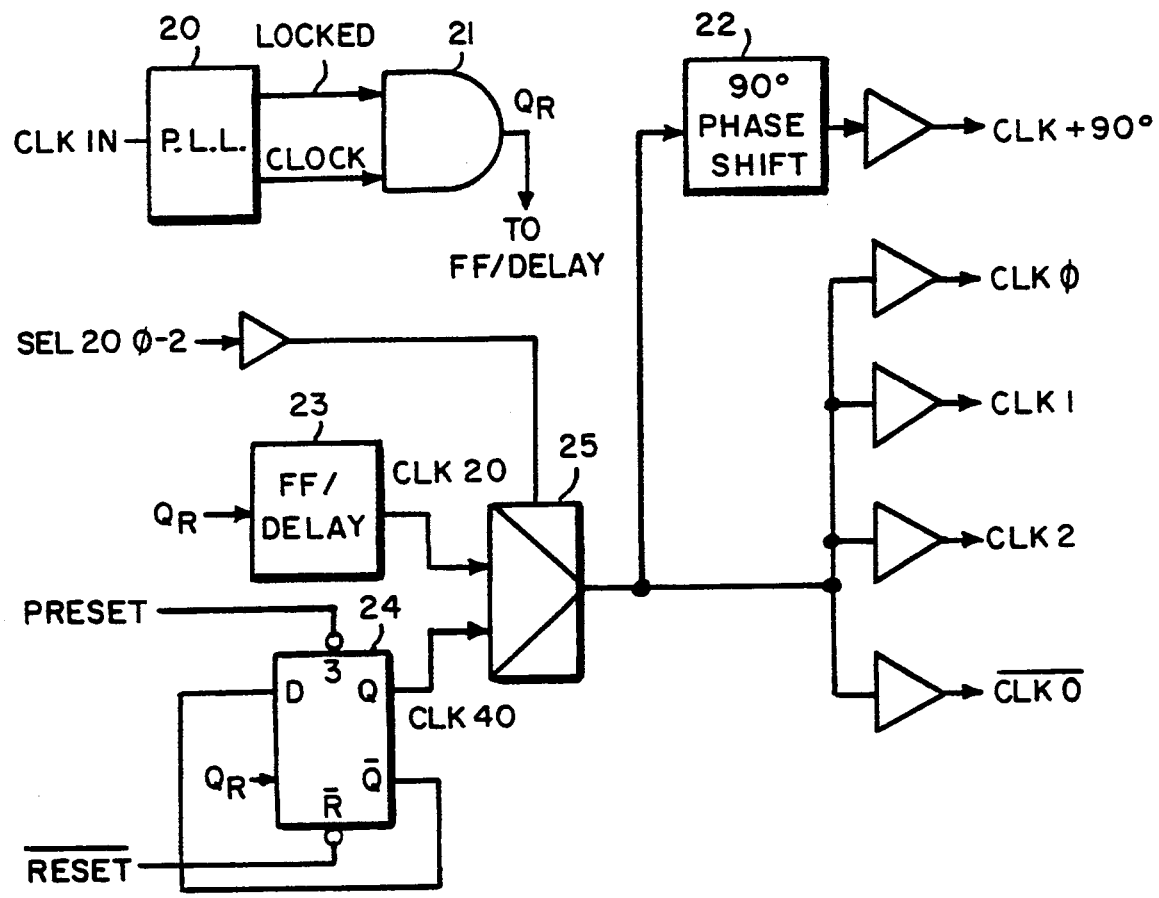
FIG. 6 shows a more detailed block diagram of a portion of the clock generation unit of FIG. 3.
Figure 6:
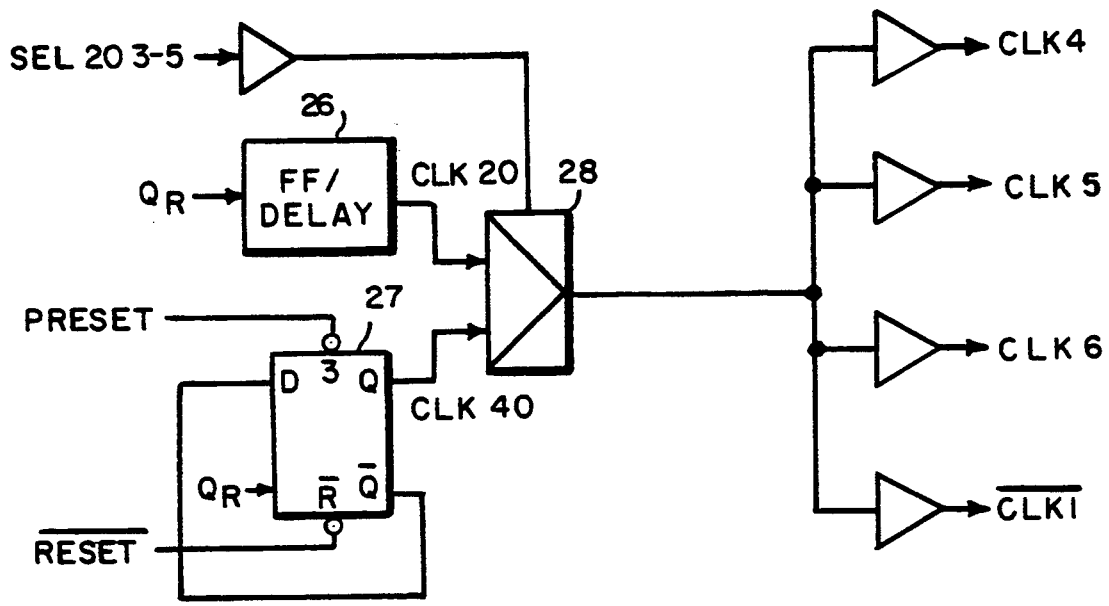

As seen in FIG. 6, the CLK_IN signal is supplied to a phase locked loop (PLL) circuit 20 to produce an internal reference clock signal $Q_R$ via output AND logic unit 21 when the loop is locked in operation (LOCKED) and supplies a CLOCK output therefrom.

$Q_R$ is supplied to a pair of similar flip-flop/delay circuits 23 and 24, one of which is shown in more detail, the operations of which are suitably preset by a PRESET signal to produce a clock signal the frequency of which is a sub-multiple of the frequency of $Q_R$. In the particular embodiment being depicted, for example, $Q_R$ has a frequency of 100 MHz while flip-flop circuit 23 and 24 produce clock signals CLK$_{20}$ and CLK$_{40}$ which have periods of 20 nanosec. and 40 nanosec., respectively.

Multiplexor (MUX) 25 selects one of the flip flop output clock signals in accordance with a select control signal (SEL $\phi$-2) from the processor to produce clock signals which can be supplied as processor clock signals CLK$\phi$-2 and $\overline{\text{CLK}\phi}$. The output clock signal from MUX 25 is also supplied to a 90° phase shift circuit 22 to supply processor clock signal CLK+90°. Similar circuitry is used to produce additional processor clock signals CLK 3-5 and $\overline{\text{CLK 1}}$ using flip-flop/delay circuits 26 and 27 and multiplexor 28, as shown.

The generation of the above discussed processor clock signals using the units shown in FIG. 6, would be well known to those in the art. The circuitry shown in FIG. 7 depicts the generation of gated clock signals Q$\phi$-Q6, in accordance with the invention.

As seen therein, with specific reference to the generation of a gated signal Q$\phi$, for example, the internal reference clock signal $Q_R$ is further supplied to a D-flip flop circuit 30 which has been preset in accordance with a signal from the processor ($\overline{\text{IPRE}\phi\text{-3}}$). The flip flop unit 30 provides Q and $\overline{Q}$ outputs therefrom one of which is in turn selectively fed back to the D-input via a multiplexor (MUX) 31. MUX 31 is enabled by an enable signal $\overline{\text{EN}\phi}$ from the processor via input buffer unit 32 which is supplied when a gating unit requires a gated clock signal Q$\phi$ to be produced. Enablement of MUX 31 produces a clock output from the Q output of flip flop unit 30 which is supplied as the required gated clock signal Q$\phi$ via a delay unit 33, the delay of which can be suitably selected, and output buffer unit 34.

Figure 7:
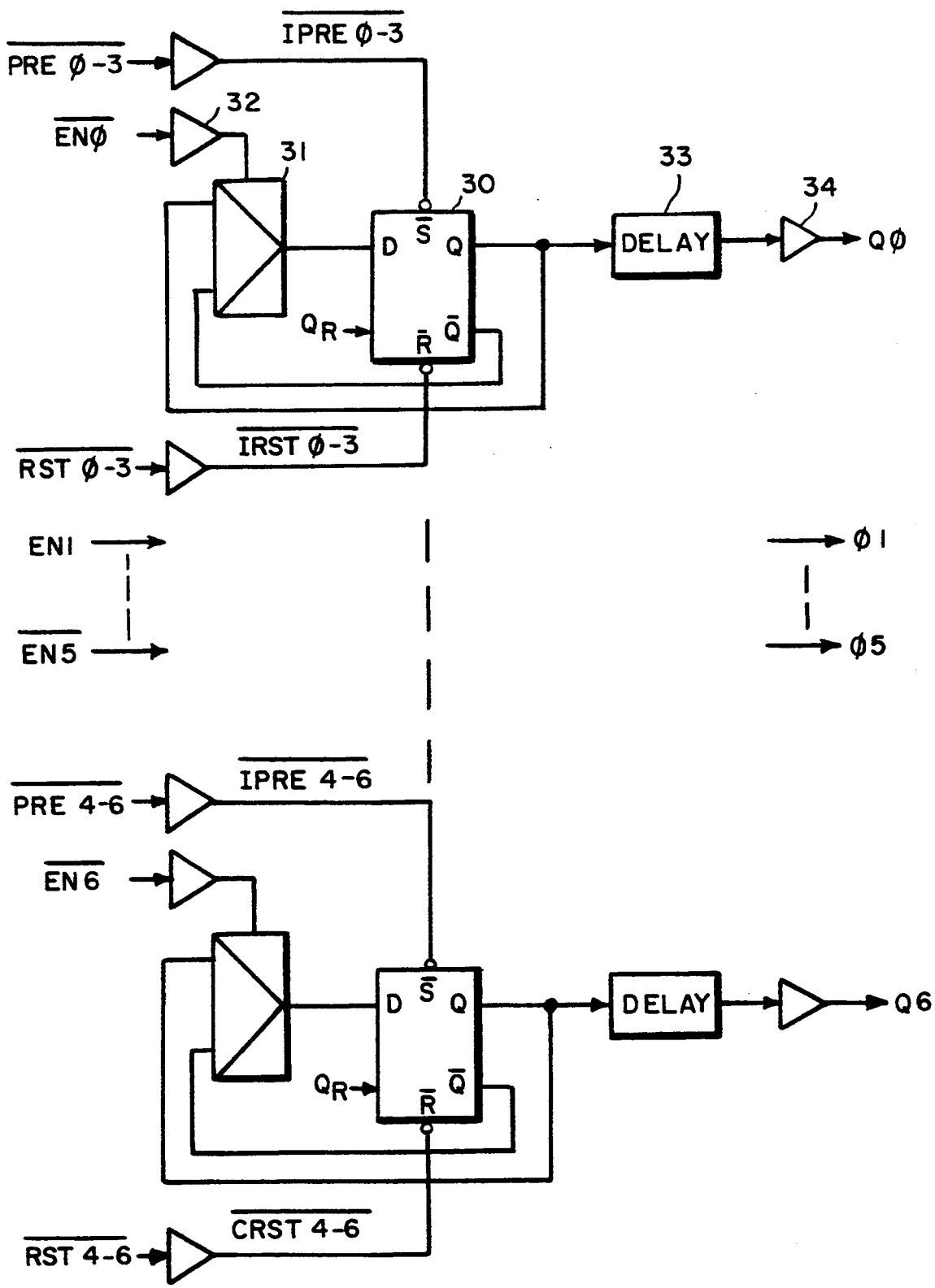
FIG. 7 shows a more detailed block diagram of another portion of the clock generation unit of FIG. 3.

In a similar manner gated clock signals Q1-Q6 are produced, as shown in FIG. 7, using the $Q_R$ signal and the enable signals $\overline{\text{EN1}}$-$\overline{\text{EN6}}$. All of the gated clock signals Q$\phi$-Q6 are synchronous with the processor clock signals (e.g., CLK $\phi$-6) in that the edges thereof coincide. The time relationships of the signals discussed with reference to FIG. 7 are shown in FIG. 5.

In accordance with the operation discussed with reference to FIG. 7, fixed time delays occur in accordance with the inherent internal time delays associated with input buffer 32, MUX 31, flip flop 30, and output buffer 34. The time delay of delay unit 33, however, can be adjusted to select a desired time delay therein, such as by using a multiplexor unit having a selectable time delay. Thus, the overall time delay between the time the processor requests a gated clock signal Q$\phi$ (i.e., the time EN$\phi$ is asserted) and the time Q$\phi$ is available is determined by the fixed time delays and the adjustable time delay, discussed above. In order to assure that Q$\phi$ is synchronous with, i.e., its edge coincides with the edges of, the processor CLK signals, such overall time delay is set (by adjusting delay unit 33) to be essentially the same as the time delay which is required to generate the processor CLK signals in FIG. 6. If the time delay required to generate the CLK signals is 9 nanosec., for example, the fixed time delays associated with buffer 30, MUX 31, flip flop 30, and output buffer 34 are 2 nanosec., 1 nanosec., 1 nanosec., and 3 nanosec., respectively, so that the time delay for delay unit 33 is set to 2 nanosec. for a total time delay of 9 nanosec.

Accordingly, when the enable signals are applied the leading edges of the gated signals Q$\phi$-Q6 are made to coincide with the leading edges of the processor CLK signals so that the gated Q signals are synchronous therewith. The total time delay for producing the gated clock signals, using the circuitry of FIG. 7, can be such that the overall time needed to enable the operating units involved is reduced from that required when generating gated clock signals using a registered PAL unit.

The embodiment of the invention described above represents a specific preferred embodiment thereof, although modifications thereof may occur to those in the art within the spirit and scope of the invention.

Hence, the invention is not to be construed as limited to the specific embodiment described, except as defined by the appended claims.

What is claimed is:

1. A clock generator system for generating at least one gated clock signal for use in a data processing system which includes a processor and at least one unit for providing an output signal from an input signal when enabled by said gated clock signal, said clock generator system comprising
   a reference clock generator connected to said processor for providing an internal reference clock signal in response to a free-running clock signal in said processor;
   a processor clock generator connected to said reference clock generator and responsive to said internal reference clock signal for providing at least one processor clock signal;
   a gated clock generator connected to said reference clock generator and responsive to said internal reference clock signal and connected to said processor and responsive to an enable signal therefrom for producing at least one gated clock signal; and
   time delay circuitry connected to said gated clock generator for providing a time delay for said gated clock signal to provide a time delayed gated clock signal which is substantially synchronous with said at least one processor clock signal.

2. A clock generator system for generating a plurality of gated clock signals for use in a data processing system which includes a processor and a plurality of operating units each for providing an output signal from an input signal when enabled by one of said gated clock signals, said clock generator system comprising
   a reference clock generator connected to said processor for providing an internal reference clock signal in response to a free-running clock signal in said processor;
   a processor clock generator connected to said reference clock generator and responsive to said internal reference clock signal for providing a plurality of processor clock signals which are in phase with each other;
   a gated clock generator connected to said reference clock generator and responsive to said internal reference clock signal and connected to said processor and responsive to a plurality of enable signals therefrom for producing a plurality of gated clock signals; and time delay circuitry connected to said gated clock generator for providing a time delay for each of the plurality of gated clock signals produced thereby to provide a plurality of time delayed gated clock signals each of which is synchronous with said processor clock signals.

3. A clock generator system in accordance with claims 1 or 2 wherein
   said gated clock generator includes at least one flip-flop unit responsive to said internal reference clock signal, multiplexor means responsive to an enable signal and to output signals of said flip-flop unit for supplying one of said output signals to an input of said flip-flop unit to produce a selected gated clock output therefrom, the time delay circuitry responding to said selected gated clock output and providing a selectable time delay therefor so that said gated clock generator and time delay circuitry provide an overall time delay to provide a selected time delayed gated clock signal therefrom which is synchronous with said processor clock signals.

4. A clock generator system in accordance with claim 3 wherein said time delay means is a multiplexor unit having a selectable time delay.

5. A clock generator system in accordance with claims 1 or 2 wherein said reference clock generator produces an internal reference clock signal having a frequency which is a multiple of the free-running clock signal and said processor clock generator produces one or more processor clock signals each having a frequency which is a sub-multiple of the frequency of the internal reference clock signal.

6. A clock generator system in accordance with claim 5 wherein said gated clock generator produces one or more gated clock signals each having a frequency which is a sub-multiple of said internal reference clock signal.

7. A clock generator system in accordance with claim 6 wherein said processor clock generator includes selector circuitry for selectively producing either a first group of processor clock signals having a first frequency which is a first sub-multiple of and in phase with the internal reference clock signal or a second group of processor clock signals having a second frequency which is a second sub-multiple of and in phase with the internal reference clock signal.

8. A clock generator system in accordance with claim 7 wherein the internal reference clock signal has a selected one of two frequencies whereby said first frequency and said second frequency each has one of two frequencies corresponding to the selected one of the frequencies of the internal reference clock signal.

9. A clock generator system in accordance with claim 8 wherein said internal reference clock signal has a frequency of 80 mHz or 100 mHz, said first frequency is 40 mHz or 50 mHz, and said second frequency is 20 mHz or 25 mHz.

* * * * *